United States Patent [19]

Baas et al.

[11] 3,780,432

[45] Dec. 25, 1973

[54] METHOD OF ESTABLISHING RELATIVELY INSULATED CONNECTIONS BETWEEN CONDUCTOR ENDS AND AN INSULATING SUBSTRATE

[75] Inventors: Gerardus Baas; Frans Victor Willem Ten Bloemendal, both of Nijimegen, Netherlands

[73] Assignee: U.S. Philips Corporation, New York, N.Y.

[22] Filed: Aug. 10, 1971

[21] Appl. No.: 170,482

[30] Foreign Application Priority Data

Aug. 12, 1970 Netherlands ...................... 7011885

[52] U.S. Cl. ...................... 29/625, 29/624, 29/626, 174/68.5

[51] Int. Cl. ........................................ H05k 3/02

[58] Field of Search ........................................ 29/624–630, 630 B; 113/119; 174/68.5

[56] References Cited

UNITED STATES PATENTS

| | | | |
|---|---|---|---|
| 3,340,347 | 9/1967 | Spiegler | 29/630 B |
| 3,340,491 | 9/1967 | Deakin | 29/630 B |
| 3,396,461 | 9/1968 | Spooner | 29/630 B |
| 3,618,200 | 11/1971 | Masao Matsuo et al. | 29/630 B |
| 3,371,148 | 2/1968 | Roques et al. | 29/626 X |
| 3,381,081 | 4/1968 | Schalliol | 29/626 X |
| 3,390,308 | 6/1968 | Marley | 29/626 X |
| 3,396,461 | 8/1968 | Spooner et al. | 29/630 B |
| 3,434,940 | 3/1969 | Brown et al. | 29/626 X |

*Primary Examiner*—Charles W. Lanham
*Assistant Examiner*—Joseph A. Walkowski
*Attorney*—Frank R. Trifari

[57] ABSTRACT

A method of establishing relatively insulated connections between the ends of metal conductors arranged in a mounting frame and an insulating substrate, the substrate surface being provided with a metal coating and the conductor ends being secured to said metallized surface, after which the metallized surface is subjected to a process attaching the metal coating so that the metal regions located between the conductor ends are removed from the substrate.

5 Claims, 3 Drawing Figures

PATENTED DEC 25 1973 3,780,432

INVENTORS
GERARDUS BAAS
FRANS VICTOR W. TEN BLOEMENDA
BY
Frank R. Trifari
AGENT

METHOD OF ESTABLISHING RELATIVELY INSULATED CONNECTIONS BETWEEN CONDUCTOR ENDS AND AN INSULATING SUBSTRATE

The invention relates to a method of establishing relatively insulated connections between the ends of metal conductors arranged in a mounting frame and an insulating substrate.

In a known method of manufacturing semiconductor devices such as integrated circuits ends of conductors arranged in a frame are connected with contact areas on a semiconductor body. Subsequently, a ceramic, electrically insulating disc is fastened by means of a glue to the conductor ends and the semiconductor body. Thus the conductor ends and the contact areas are protected from excessive tensile and compression stresses likely to occur before the assembly is encapsulated. A protection is also obtained from variable stresses due to discrepancies in expansion coefficients of the conductors and the enveloping material. In this known method the solid ceramic disc is lacking during the connection of the semiconductor body with the conductor ends so that a vulnerable assembly is obtained, which requires delicate handling. Therefore, the subsequent disposition of the ceramic disc on the fastened conductor ends and the semiconductor body may give rise to trouble, for example, due to damage of fastening areas between the semiconductor body and the conductor ends mainly as a result of displacement of the conductor ends.

It is furthermore known to fasten conductor ends in relatively insulated disposition to a solid substrate before connecting a semiconductor body with the conductor ends. In this case the substrate is provided with a vitreous layer in which the ends forming part of a conductor frame are fastened. This method has the disadvantage of requiring extreme accuracy in handling in order to avoid a glass coating on the top sides of the conductor ends, which would thus become unsuitable for establishing a contact with the semiconductor body.

With transistors it is known to provide a substrate with a metal coating in discrete regions, to which current supply conductors are fastened, for example, by means of solder, the resultant connection being quite satisfactory. However, it is then necessary to provide first the discrete metal regions on the substrate, after which the conductors are positioned relatively to said regions, and subsequently secured in place. Particularly integrated circuits would require many accurately arranged metal regions, whilst the conductor ends held in a frame had to be positioned with respect to said regions with high accuracy.

The invention has for its object to provide a method of establishing relatively insulated connections between the ends of metal conductors held in a mounting frame and an insulating substrate, which method can be carried out in a very simple manner and obviates the disadvantages of the known methods. According to the invention the surface of the substrate, to which the conductor ends have to be secured, is metallized, the conductor ends are mechanically fastened to the metallized substrate surface in electrically conductive manner and the metallized substrate surface with the conductor ends secured thereto is subjected to a process of attacking the metal coating such that the metal located between the conductor ends is removed from the substrate.

In this method it is therefore not necessary to provide first the metal regions in accurate arrangement on the semiconductor body and to position subsequently the conductor ends accurately with respect to these metal regions. The conductor ends are simply put in fairly random positions on the completely metallized disc, to which they are secured by soldering, ultrasonic welding or thermo-compression bonding. A very firm connection is thus obtained. The relative insulation of the conductor ends is obtained by the subsequent attack of the metal. The thin metal layer on the substrate is completely removed with the exception of the portions located beneath the conductors. The conductors are also affected, but since the thickness of the conductors is many times larger than the thickness of the metal layer, the quantity of metal removed from the conductors is comparatively small. The resultant support with the conductors is particularly suitable for fastening a semiconductor body. It forms a mechanically stable, solid base, which is highly desirable for such a connection. Moreover, a better drainage of heat is obtained than without the use of the substrate or in a connection by means of glass or glue. Discrepancies of expansion coefficients of the conductors and the final encapsulating material of the semiconductor device, for example, an epoxy resin, will not give rise to stress of the connection areas between the conductor ends and the semiconductor body.

The removal of metal from the ceramic substrate is preferably carried out by subjecting the substrate surface to a blast of hard, granular material. The granular material may be alumina or silicon carbide particles blown onto the surface by means of an air jet. Sandblasting is also possible.

A further variant of this method permits of subjecting the surface to an etching process.

The invention will be described more fully with reference to an embodiment shown in the drawing.

Figure 1:
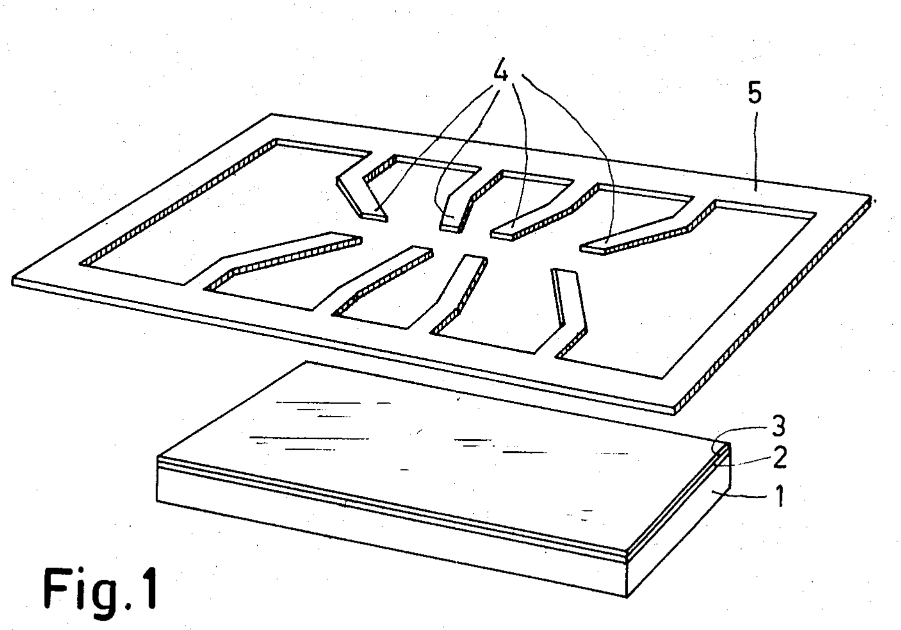
FIG. 1 shows a ceramic disc and a grid of conductors.

FIG. 1 shows an electrically insulating disc 1 of ceramic material, which is preferably satisfactorily heat-conductive. Suitable material for the disc 1 may be aluminium oxide or beryllium oxide. The top surface of the disc 1 is completely metallized. A single metal layer may be sufficient, but it is advantageous to apply the metal in two consecutive steps, First a thin layer of a material satisfactorily adhering to the ceramic disc, for example, titanium may be deposited; subsequently a solderable layer 3, for example, of nickel or copper, is applied to the layer 2. The conductor ends 4 of the conductor frame 5 are secured to the layer 3, for example, by soldering. The layers 2 and 3 may be deposited from the vapour phase.

Figure 2:
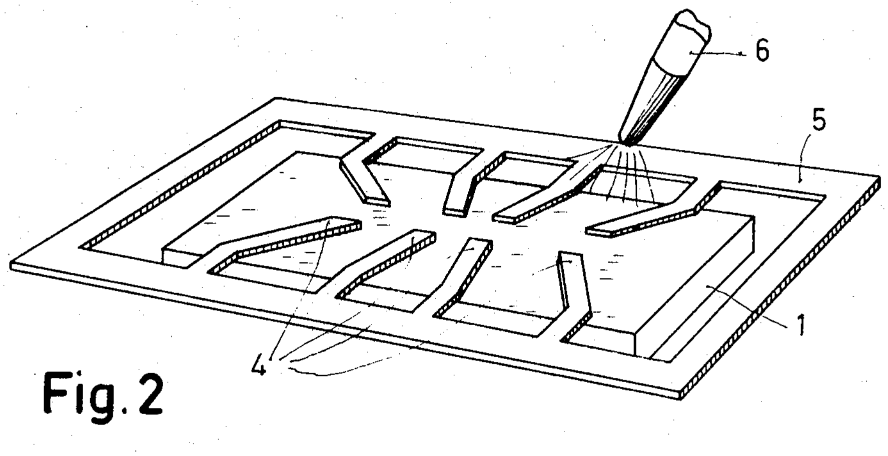
FIG. 2 illustrates the removal of the redundant portions of the metal coating after the grid of conductors has been secured to the disc.

FIG. 2 shows the metallized disc 1, to which the ends 4 of the conductor frame are secured. This operation does not require accurate positioning. The connection is preferably established by means of hard solder, although soft solder may also be used. The solder may be used in the form of a foil and be applied like a galvanic layer to the layer 3 of the disc 1 or to the conductors.

After the ends 4 of the conductor frame 5 have been secured to the disc 1, the metal portions not located beneath the conductor ends 4 are removed. This may be carried out in a simple manner, for example, by blasting. FIG. 2 shows part of a mouthpiece 6, through which by means of an air jet small particles of hard material, for example, aluminium oxide or silicon carbide are blown onto the surface of the disc 1. The metal coating of the layers 2 and 3 and the solder layer, if any, are thus removed as far as they are not covered by the conductor ends. Material is thus also removed from the conductor ends. However, since the thickness of the conductors is considerably larger than the thickness of the metal layers 2 and 3 — a conventional thickness of the conductors is 70 $\mu$m to 100 $\mu$m, whereas the metal coating usually has a thickness of a few microns- the slight reduction in thickness of the conductor ends will not have any adverse effect.

Instead of removing the metal coating with the aid of a blasting process, this may be performed by an etching process. However, the blasting process is less circuitous and is to be preferred.

After the blasting process the conductor frame may be galvanized in order to obtain a correct base for fastening contact regions of the semiconductor body to the conductor ends.

Figure 3:
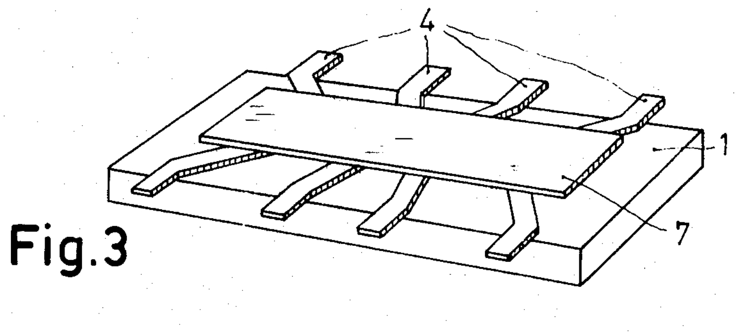
FIG. 3 shows the final shape of the substrate with the conductors and a semiconductor body secured thereto.

FIG. 3 shows the supporting disc 1 with the conductors secured thereto, a semiconductor body 7 being fastened thereto. The semiconductor body may comprise an integrated circuit. The contact regions of the circuit may be provided with soldering balls by means of which the semiconductor body is soldered to the conductor ends. After the application of a small quantity of a synthetic resin around the semiconductor body the assembly forms a ready product. As an alternative, the assembly may be arranged in a second conductor array and subsequently encapsulated in an epoxy resin.

What is claimed is:

1. A method of producing an assembly comprising an electrically insulating substrate and a plurality of mutually insulated electrical connection elements thereon, said method comprising:

a. providing a continuous metal coating on a face of said substrate;

b. providing a sub-assembly comprising said electrical connection elements in spaced relation with respect to each other, said elements individually having conductor ends;

c. electrically and mechanically securing said electrical connection elements at said conductor ends to said metal coating, said conductor ends covering only a portion of said metal coating and other portions of said elements projecting laterally from said coating; and, then;

d. removing all parts of said metal coating except those located under the connection elements and masked thereby during the removal step.

2. A method as recited in claim 1, wherein said subassembly comprises said electrical connection elements extending in substantially the same direction and being individually connected to a surrounding frame member.

3. A method as recited in claim 1, wherein said step of removing comprises directing hard granular material onto the coating from a position located above the connection elements.

4. A method as recited in claim 1, wherein said step of removing comprises etching said metal coating.

5. A method as recited in claim 1, wherein said substrate comprises thermally conducting material.

* * * * *